US009815547B2

(12) United States Patent
Saliveros et al.

(10) Patent No.: US 9,815,547 B2
(45) Date of Patent: Nov. 14, 2017

(54) FLAP SYSTEM FOR AN AIRCRAFT, METHOD FOR ADJUSTING THE LIFT OF AN AIRCRAFT AND AIRCRAFT COMPRISING A MAIN WING AND AT LEAST ONE FLAP SYSTEM

(71) Applicant: Airbus Operations GmbH, Hamburg (DE)

(72) Inventors: Efstratios Saliveros, Bristol (GB); Hendrik Friedel, Weyhe (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/134,102

(22) Filed: Dec. 19, 2013

(65) Prior Publication Data
US 2014/0166819 A1 Jun. 19, 2014

Related U.S. Application Data

(60) Provisional application No. 61/739,080, filed on Dec. 19, 2012.

(30) Foreign Application Priority Data

Dec. 19, 2012 (EP) .................................. 12198226

(51) Int. Cl.
*B64C 3/50* (2006.01)
*B64C 9/18* (2006.01)
(Continued)

(52) U.S. Cl.
CPC .................. *B64C 9/18* (2013.01); *B64C 3/50* (2013.01); *B64C 9/04* (2013.01); *B64C 9/06* (2013.01)

(58) Field of Classification Search
CPC ....................................................... Y02T 50/32
(Continued)

(56) References Cited

U.S. PATENT DOCUMENTS 2,791,385 A 5/1957 Johnson
4,120,470 A * 10/1978 Whitener .................. B64C 9/20
244/213

(Continued)

FOREIGN PATENT DOCUMENTS

DE 10 2010 032 224 A1 1/2012

OTHER PUBLICATIONS

NACA ACR. No. L5F28 (1946).
(Continued)

*Primary Examiner* — Brian M O'Hara
*Assistant Examiner* — Keith L Dixon
(74) *Attorney, Agent, or Firm* — Lerner, David, Littenberg, Krumholz & Mentlik, LLP

(57) ABSTRACT

A flap system for an aircraft includes a flow body, a trailing flap and a movement means. The flow body includes an upper surface and a lower surface, the lower surface having a recess. The movement means is attachable to the flow body and the trailing flap. The trailing flap includes a shape that corresponds to the recess in the lower surface. The movement means is adapted for conducting at least a chordwise movement of the trailing flap such that it is movable out of and into the recess of the flow body in absence of a gap between the leading edge of the trailing flap and the flow body. Thereby, a clear increase in a lift coefficient may be achieved, while at the same time maintaining a low complexity and a high reliability of the flap system.

12 Claims, 3 Drawing Sheets

(51) Int. Cl.
*B64C 9/04* (2006.01)
*B64C 9/06* (2006.01)

(58) Field of Classification Search
USPC .................................................. 244/213, 215
See application file for complete search history.

(56) References Cited

U.S. PATENT DOCUMENTS

| | | | | |
|---|---|---|---|---|
| 4,180,222 | A | | 12/1979 | Thornburg |
| 4,247,065 | A | * | 1/1981 | Grob .................... B64C 3/48 16/275 |
| 4,285,482 | A | * | 8/1981 | Lewis .................... B64C 9/22 244/207 |
| 4,360,176 | A | * | 11/1982 | Brown .................... B64C 9/24 244/214 |
| 4,448,375 | A | * | 5/1984 | Herndon .................... B64C 9/16 244/215 |
| 4,725,026 | A | * | 2/1988 | Krafka .................... B64C 9/16 244/213 |
| 4,796,840 | A | * | 1/1989 | Heynatz .................... B64C 9/16 244/213 |
| 4,834,326 | A | * | 5/1989 | Stache .................... B64C 9/18 244/210 |
| 5,294,080 | A | * | 3/1994 | Ross .................... B64C 9/14 244/215 |
| 6,079,672 | A | * | 6/2000 | Lam .................... B64C 9/00 244/216 |
| 6,247,670 | B1 | * | 6/2001 | Eliahou-Niv ............. B64C 3/50 244/204 |
| 7,004,432 | B2 | * | 2/2006 | Robinson .................... B64C 9/14 244/211 |
| 7,048,235 | B2 | * | 5/2006 | McLean .................... B64C 3/28 244/204 |
| 7,258,308 | B2 | * | 8/2007 | Beyer .................... B64C 9/18 244/213 |
| 7,963,484 | B2 | * | 6/2011 | Raudszus .................... B64C 3/50 244/213 |
| 8,302,913 | B2 | * | 11/2012 | Schlipf .................... B64C 9/16 244/215 |
| 8,393,570 | B2 | * | 3/2013 | Gartelmann ............. B64C 9/20 244/214 |
| 8,567,727 | B2 | * | 10/2013 | Morris .................... B64C 9/26 244/211 |
| 2006/0175469 | A1 | | 8/2006 | Gnarowski et al. |
| 2007/0102587 | A1 | * | 5/2007 | Jones .................... B64C 9/22 244/214 |
| 2009/0057493 | A1 | | 3/2009 | Sankrithi et al. |
| 2010/0096497 | A1 | | 4/2010 | MacGregor |
| 2011/0127386 | A1 | | 6/2011 | Morris |
| 2013/0214092 | A1 | | 8/2013 | Friedel |

OTHER PUBLICATIONS

National advisory committee for aeronautics, Technical Memorandum Nr. 1108 "Force and pressure-distrubution measurements on a rectangular wing with an slotted droop nose and with either plain and split flaps in combination or a slotted flap" by H.G. Lemme Washington (Mar. 1947).

\* cited by examiner

FLAP SYSTEM FOR AN AIRCRAFT, METHOD FOR ADJUSTING THE LIFT OF AN AIRCRAFT AND AIRCRAFT COMPRISING A MAIN WING AND AT LEAST ONE FLAP SYSTEM

CROSS-REFERENCE TO RELATED APPLICATIONS

This application claims the benefit of the filing date of U.S. Provisional Patent Application No. 61/739,080, filed Dec. 19, 2012, the disclosures of which is herewith incorporated herein by reference.

TECHNICAL FIELD

The invention relates to a flap system for an aircraft, a method for adjusting the lift of an aircraft and an aircraft comprising a wing and at least one flap system.

BACKGROUND OF THE INVENTION

Larger commercial aircraft usually comprise high lift systems that include flow influencing control surfaces on the leading edge and/or the trailing edge of a main wing. For example, so-called trailing edge flaps are distributed along a region of a trailing edge and may be extended from a retracted state into a desired deployed position, which may depend on the actual lift requirement, the angle of attack of the aircraft and a desired velocity. Trailing edge flaps are highly diversified and may be realized by slotted flaps, fowler flaps, slotted fowler flaps, split flaps, etc. Most commonly, single or double slotted fowler flaps are used on larger commercial aircraft.

The integration of certain systems into an aircraft often follows a trade-off between flight performance, weight, integration costs, reliability, mechanical complexity and maintenance requirements. While for example the integration of a double slotted fowler flap system into an aircraft may be more expensive and more complex than a single slotted flap system, the flight performance may be clearly improved.

In order to achieve a certain gain in flight performance and especially in realizing a maximum lift coefficient $C_L$ it is possible to choose from existing high lift systems and especially flap systems during the design of an aircraft. Known flap systems may provide for a rather rough gradation in achievable flight performance characteristics. Hence, a chosen flap system may have clear performance reserves compared to other flap systems, which have not been chosen for the design, that may not have provided a sufficient performance.

BRIEF SUMMARY OF THE INVENTION

An aspect of the invention provides a flap system that is able to provide an increase in the lift coefficient $C_L$ of the wing, while having a low complexity, low additional weight and a high reliability.

A flap system is proposed comprising a flow body, a trailing flap and a movement means, wherein the flow body comprises an upper surface and a lower surface, the lower surface comprising a recess, wherein the movement means is attachable to the flow body and the trailing flap, wherein the trailing flap comprises a shape that corresponds to the recess in the lower surface and wherein the movement means is adapted for conducting at least a longitudinal, chordwise movement of the trailing flap such that is movable out of and into the recess of the flow body in absence of a gap between the trailing flap and the flow body.

The flow body may be realized by a plurality of different devices or arrangements and may include a wing, a wing section, a rudder, a horizontal tailplane or a flap that is movable relative to the trailing edge of a wing. The flow body comprises an upper surface and a lower surface, which are both exposed to an air flow. Thereby, the recess is situated exclusively in the lower surface. This means that the trailing flap correspondingly shaped to the recess of the flow body is exposed to an airflow that substantially only acts on the underside of the trailing flap in its retracted state, in which it is similarly designed to a split flap in a retracted position.

The movement means may move the trailing flap from its retracted state out of the recess in a chordwise direction along the recess into an extended position. The chordwise direction refers to the chord of the flow body. Thereby, a gap between the leading edge of the trailing flap and the flow body is to be prevented. For example, the leading edge region of the trailing flap moves along the upper delimiting surface of the recess of the lower surface of the flow body, while a trailing edge of the trailing flap may simply follow this chordwise motion, but may also conduct an additional rotary movement. As a result, the active surface of the flow body exposed to the airflow is increased during the extension of the trailing flap while the camber of the flow body can also increase. The chordwise motion may include a rotary component, as the flow body may comprise a certain camber and a de-cambering of the arrangement of flow-body and trailing flap should be avoided. In case the trailing flap conducts an additional rotary movement, which means exceeding any necessary rotary motion to follow the delimitation of the recess, the camber of the flow body is increased to a higher level, depending on the level of additional rotary movement.

By extending the trailing flap the overall lift coefficient $C_L$ is increased. The mechanical complexity and the weight of the flap system according to an embodiment of the invention is clearly below a conventional slotted flap system on the one hand. On the other hand, the increase in $C_L$ may have a level below the $C_L$ increase of a slotted flap system. Therefore, the flap system according to an embodiment of the invention may be useful for providing an increase in $C_L$, for which a slotted flap system may be considered unnecessary.

Furthermore, the flap system according to an embodiment of the invention may supplement a single slotted flap system in that it is integrated at a trailing edge flap of the slotted flap system. In case a double slotted flap system would not be necessary to achieve the desired flight performance characteristics but if it is desired to increase the lift coefficient of a single slotted flap not as clearly as a double slotted flap system would, the flap system as a supplement to the existing single slotted flap system according to the invention is highly advantageous.

In general, the absence of a gap may be given or may be considered if the distance between the leading edge of the trailing flap and the adjacent delimiting surface of the flow body is considerably low, e.g. clearly below 50 mm, preferably below 25 mm and most preferably below 10 mm. If possible or necessary, the gap may also be closed by a flexible sealing element at least partially.

In a further embodiment, the movement means is adapted for providing an additional rotary motion. Thereby, the trailing edge of the trailing flap may be moved vertically to the chordwise motion in order to increase the camber of the arrangement of flow body and trailing flap more clearly. The leading edge of the trailing flap may substantially be limited to the chordwise motion.

In a further advantageous embodiment, the movement means includes a mechanical linkage, which is an assembly of rigid links connected by means of joints, which joints may provide rotary or longitudinal motion. Depending on the number of linkages a kinematic chain may be created having a certain degree of freedom. For known slotted flap systems often four-link chains are used that provide a predetermined kinematic path to which the flap is bound. In the flap system according to an embodiment of the invention at least one joint and preferably two joints may be positioned on the flow body and at least another joint and preferably two joints may be situated on the trailing flap. By providing a longitudinal drive force between a fixed point of the flow body onto the trailing flap, it follows a track defined by the linkage. Such a linkage is mechanically simple, yet precise and reliable.

In another embodiment, the movement means comprises at least one roller track guide, wherein the roller track guide comprises at least one track and at least one roller, wherein the roller is guided in the at least one track. The roller track guide may be attached to the flow body and the roller may rotatably be supported in or on the trailing flap. By providing a longitudinal drive force onto the trailing flap, the roller rolls in the track and thereby guides the motion of the trailing flap along the roller track guide. It goes without saying that two distanced and parallel arranged tracks may be used for each trailing flap, such that each side of the trailing flap may be connected to a track or may be supported in a track. In case only one roller per track is used it is necessary to decrease the degree of freedom of the trailing flap by providing a linkage, which may be connected to an actuator.

In a still further embodiment, the flow body is a slotted flap movably supported on the trailing edge of a wing. The trailing flap is thereby movably arranged on a flap, which in turn is movably supported on a trailing edge of a wing. This results in a highly effective high lift system as the gain in a lift coefficient $C_L$ may be clearly increased by moving the trailing flap relative to the slotted flap. The motion of the trailing flap may be coupled with the motion of the slotted flap itself. The movement means, which may be arranged to define a motion path of the trailing flap relative to the slotted flap, may be coupled with a drive force providing device that drives the slotted flap. Alternatively, the trailing flap may also be moved independently relative to the slotted flap. This allows to move the trailing flap also with a completely retracted slotted flap such that a minor increase in $C_L$ is also possible. For example, this may be conducted through an electric drive completely integrated into the slotted flap or the trailing flap and may be supplied with electrical energy through an electrical line extending over the slotted flap into the wing of the aircraft.

An advantageous embodiment comprises a linear drive means coupled with the flow body and the trailing flap. The linear drive means may be extended to increase its length such that the trailing flap is forced to move in relation to the flow body. The drive means may comprise a spindle drive having a rotatably supported and driven spindle and a nut, wherein the nut may be swivavbly mounted in the trailing flap and the spindle drive may be connected to the flow body. The spindle may be driven by an electric motor or a fluidic motor. Alternatively, the linear drive means may be a fluidic actuator.

A further embodiment comprises a rotary drive means coupled with the flow body and the trailing flap. Such a drive means may comprise a motor supported in or at the flow body and connected to a linkage that acts on the trailing flap.

In a preferred embodiment the chordwise motion is coupled with the additional rotary motion such that the trailing flap increases its angle measured between the chord axes along the extension motion. This may be conducted by providing a sloped roller track or a four-link chain with a suitable kinematical design. Thus, the camber of the flow body may be increased. It is possible to provide an angle in a range of just exceeding 0°-15°, preferably an angle in a range of 2.5°-12.5° and most preferably in a range of 5-10°.

In another embodiment, the chordwise motion and the additional rotary motion may be conducted independently from each other. This means that the angle of the trailing flap may be altered without having to move the trailing flap in a chordwise direction. Thereby, the flap system according to the invention may also act as a split flap.

The invention further relates to a method for adjusting the lift of an aircraft, comprising the steps of moving a trailing flap out of a recess at a lower surface of a flow body by means of a movement means in a chordwise direction, wherein the trailing flap is moved such that a gap between the leading edge of the trailing flap and the flow body is not produced.

The method may further include the step of conducting a rotary motion of the trailing flap.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, irrespective of their composition in the individual claims or their interrelationships. Furthermore, identical or similar components in the figures have the same reference characters.

DETAILED DESCRIPTION

Figure 1:
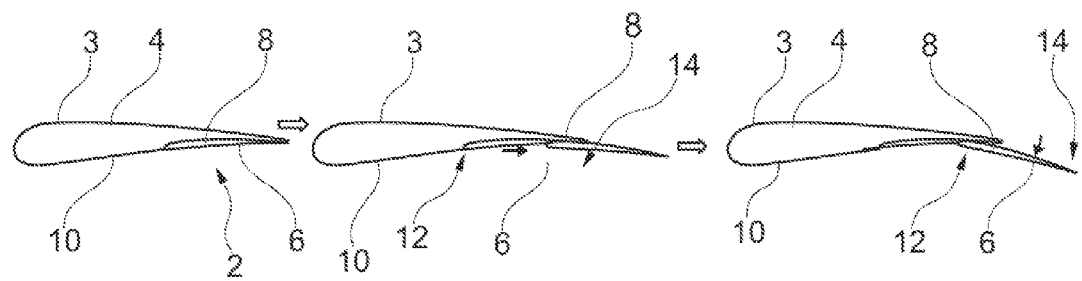
FIG. 1 shows the main working principle of the flap system in three consecutive views.

FIG. 1 shows an extension motion of a flap system 2 in consecutive drawings according to an embodiment of the invention. The flap system 2 comprises a flow body 4 having an upper surface 3 and a lower surface 10 and a trailing flap 6, which is shaped corresponding to a recess 8 at the lower surface 10 of the flow body 4. Thus, the trailing flap 6 may snugly fit into the recess 8 in its retracted position.

From the left to the right, a leading edge 12 of the trailing flap 6 conducts a chordwise motion along the chordwise extension of the flap 4 and more particularly along the recess 8 in a direction to the trailing edge of the flow body 4. During this motion, a gap between the leading edge 12 of the trailing flap 6 and the recess 8 is avoided. Therefore, the leading edge 12 of the trailing flap substantially travels along the upper delimitation of the recess 8. As mechanical tolerances need to be considered, it is clear that it is hardly possible to completely eliminate any gap but a gap may be considered absent at a distance of e.g. clearly below 10 mm.

Any existing distance between leading edge 12 of the trailing flap 6 and the upper delimitation of the recess 8 may also be bridged by one or more flexible sealing elements that closes the gap in a substantially flow- or airtight manner. Thus, also larger distances may be tolerated between the leading edge 12 of the trailing flap 6 and the recess 8.

Besides the chordwise motion of the trailing flap 6, it may also conduct an additional rotary motion, basically under rotation about a rotational axis that may intersect the cross-section of the trailing flap 6 or may be positioned completely outside of it. The actual position of such a rotary axis highly depends on the movement means, or, in other words, kinematics that are responsible for guiding and supporting the trailing flap 6. By the additional rotary motion, a trailing edge 14 of the trailing flap 6 basically provides a motion perpendicular to the chordwise motion of the leading edge 12. As a result, between consecutive extension positions there may be an angle of the chord lines of the trailing flap 6. The maximum angle between the chord line in a retracted position and the chord line in a completely extended position may be in a range of 5-12°.

The flow body 4 may be a wing of an aircraft or a slotted flap, which is movably supported at a trailing edge of a wing of an aircraft. By providing the trailing flap 6 at a trailing edge of a slotted flap, the achievable lift coefficient may exceed the value generated by the slotted flap. Furthermore, if the trailing flap 6 is movable independently from a slotted flap, it may be advantageous to use the trailing flap 6 exclusively or before the slotted flap is extended in certain flight situations.

Figure 2A:
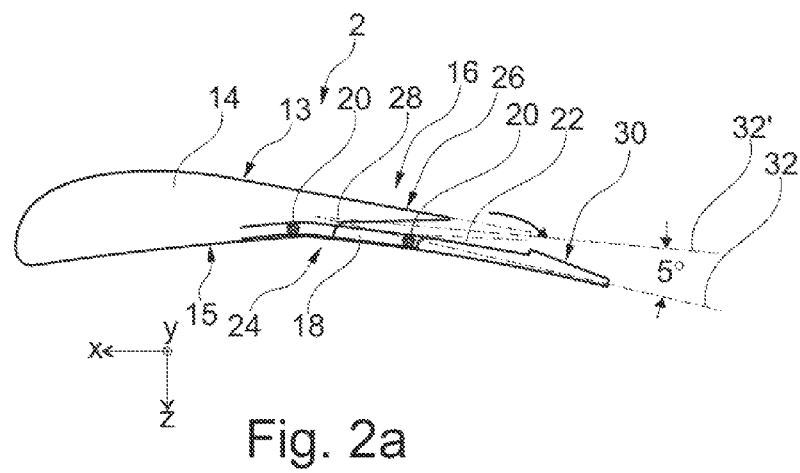
FIGS. 2a and 2b show a flap system integrated at the wing of an aircraft.

FIG. 2a shows the integration of a flap system 2 on a trailing edge 16 of a flow body in the form of a wing 14 having an upper surface 13 and a lower surface 15. Exemplarily, the flap system 2 comprises a roller track 18 as a movement means, which roller track 18 is attached to the wing 14. A pair of rollers 20 is rotatably supported on the trailing flap 22, such that the trailing flap 22 may only follow the curvature of the roller track 18. It goes without saying that other movement means, such as linkages, or a combination of linkages and a roller track may also provide for a predetermined kinematical path.

Not shown in this embodiment is a drive unit that is adapted for moving the trailing flap 22 along the predetermined kinematical path. This may be accomplished by a linear actuator such as a hydraulic cylinder or a spindle drive located between a joint on or coupled with the trailing flap and a joint on or coupled with the wing 14. By providing a linear force, a motion of the trailing flap is controlled.

As visible in FIG. 2a, the trailing flap 22 conducts a chordwise motion substantially in an x-direction. A leading edge 24 of the trailing flap 22 thereby substantially follows an upper delimitation 26 of a recess 28, in which the trailing flap 22 is situated in a retracted state. A trailing edge 30 of the trailing flap 22 may furthermore travel in an x-direction and a z-direction perpendicular thereto. A chord axis of a trailing flap 22 in an extended position has an angular position to a chord axis 32' in a retracted position. The angle between these two chord axes 32 and 32' may be in the range of 5-12°.

In this example, the rotary movement and the translatory movement are coupled through the movement means in form of the roller track 18 and the rollers 20. By changing the curvature of the roller track 18 the start position for the rotary motion may be changed, such that, for example, the rotary motion is conducted only at an end of the translatory motion. It may furthermore be possible to adjust the angle of the roller track 18 itself in order to influence the additional rotary motion of the trailing flap 22.

Figure 2B:
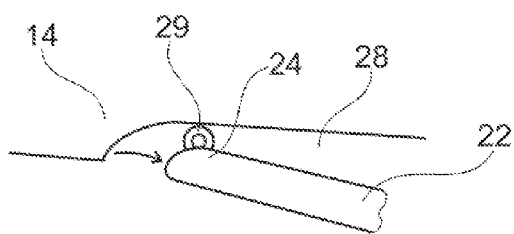

In FIG. 2b a detail of the leading edge 24 of the trailing flap 22 under the recess 28 of the flow body 14 is shown. Here, a flexible sealing element 29 is exemplarily located on an upper surface of the leading edge 24 of the trailing flap 22, which sealing element 29 may close or bridge any remaining gap between the leading edge 24 of the trailing flap 22 and the flow body 14. Therefore, the kinematic requirements and manufacturing tolerances may be less strict.

Figure 3:
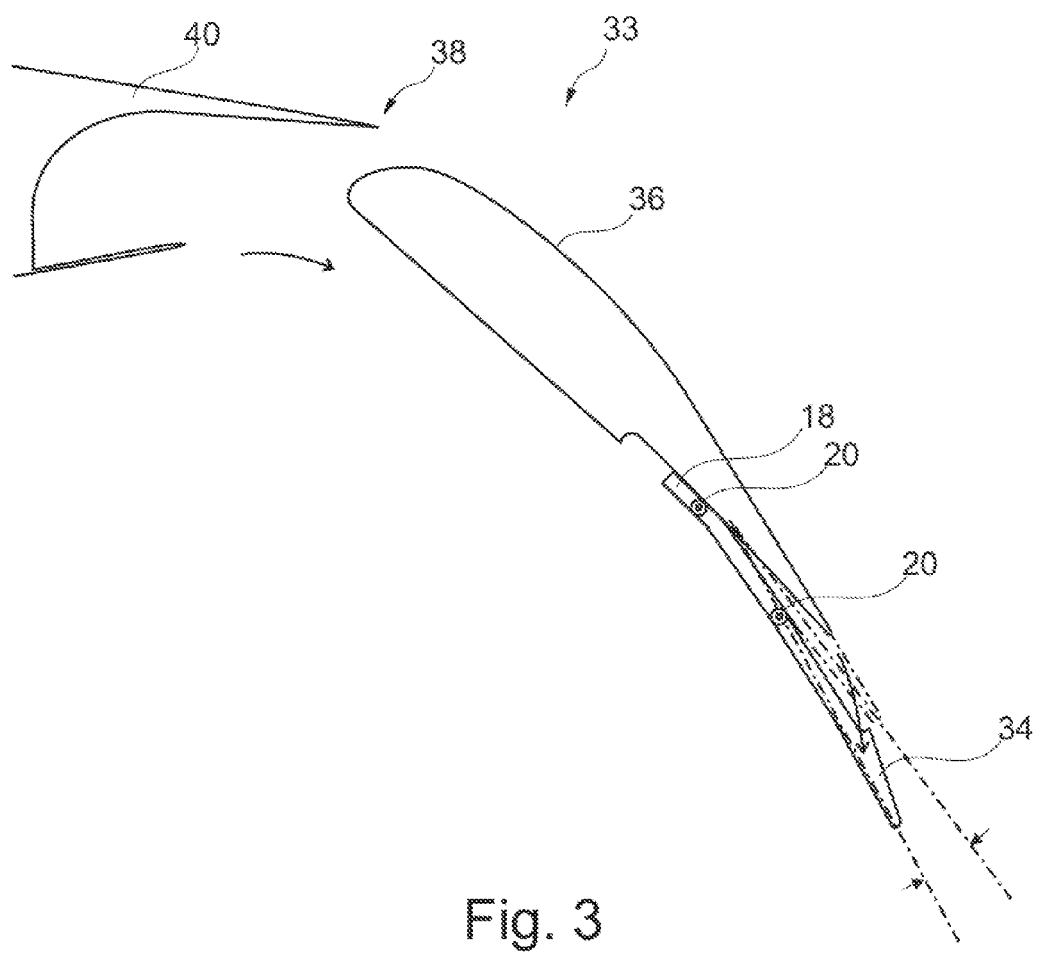
FIG. 3 shows a flap system with a slotted flap and a trailing flap.

In another exemplary embodiment depicted in FIG. 3, a trailing flap 34 is again guided through a movement means in the form of a roller track 18 and a pair of rollers 20. Other than in FIG. 2 the flow body in this case is a slotted flap 36, which in turn is movably supported on a trailing edge 38 of a wing 40. The trailing flap 34 may be moved independently from the flap 36 such that in a retracted state of the slotted flap 36, the section camber may be increased without a flap chord extension. Thereby, the trailing flap 34 may resemble a tab.

Figure 4:
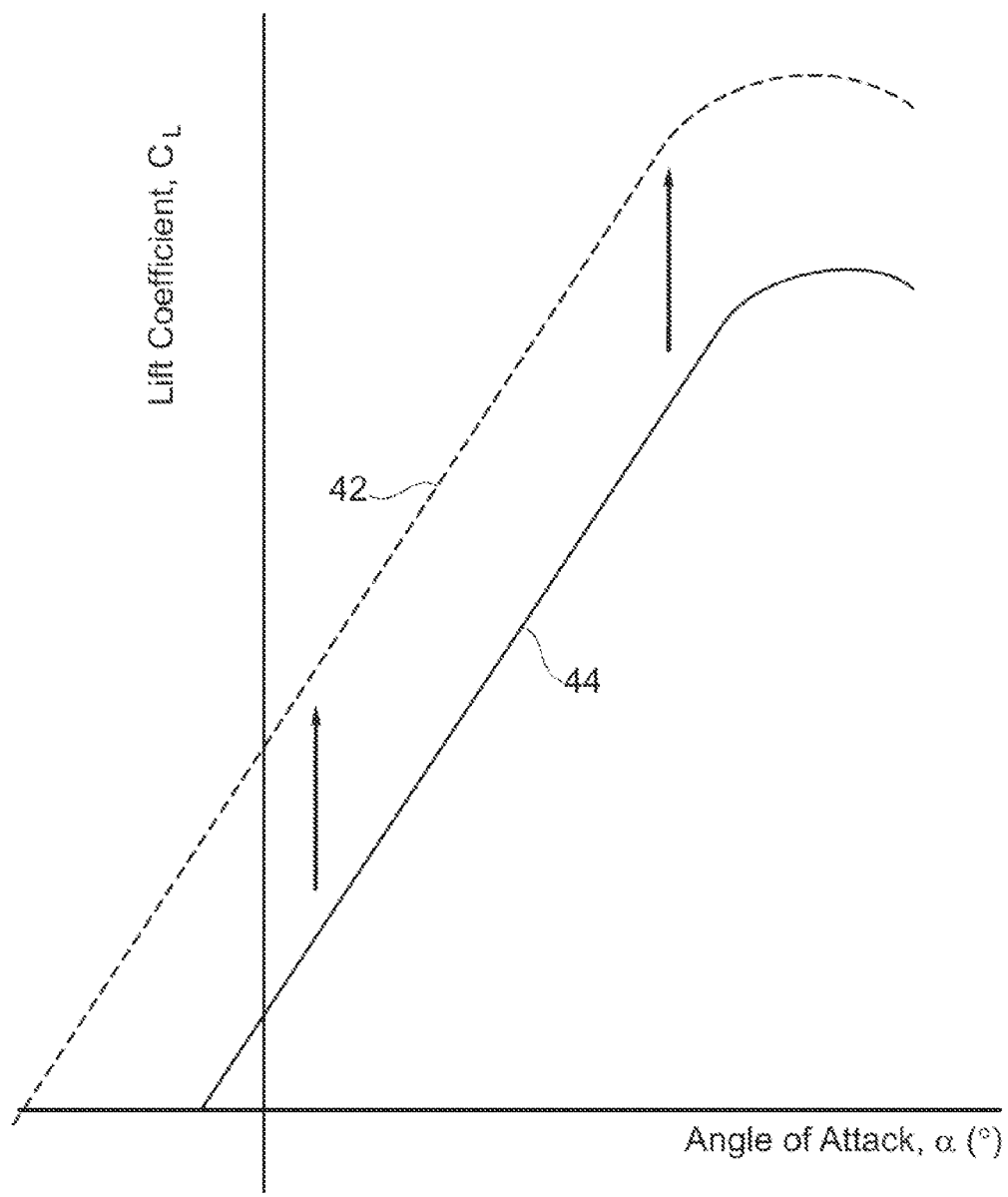
FIG. 4 contains a qualitative diagram showing an increase in the lift coefficient ($c_L$ over $\alpha$).

FIG. 4 shows the impact on the lift coefficient in relation to the angle of attack in a qualitative view. A solid curve 44 resembles the lift coefficient with a retracted trailing flap, while the dashed line shows the lift coefficient with a fully extended trailing flap according to an embodiment of the invention.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A flap system for an aircraft, the flap system comprising:
    a flow body;
    a trailing flap; and
    a movement means;
    wherein the flow body comprises an upper surface and a lower surface, the lower surface having a recess,
    wherein the movement means is attachable to the flow body and the trailing flap;
    wherein the trailing flap comprises a shape corresponding to the recess in the lower surface and having a retracted position and at least first and second extended positions;
    wherein the movement means is adapted for conducting at least a chordwise movement of the trailing flap such that the trailing flap is movable out of the recess of the flow body from the retracted position into the first extended position substantially without a gap between the leading edge of the trailing flap and the flow body,
    wherein the trailing flap is movable from the first extended position into the second extended position by conducting a rotary motion additional to the chordwise movement, and
    wherein the movement means comprises at least one roller track guide, wherein the roller track guide comprises at least one track and at least one roller, wherein the roller is guided in the at least one track.

2. The flap system of claim 1, wherein the movement means includes a mechanical linkage.

3. The flap system of claim 1, wherein the flow body is a slotted flap movably supported on the trailing edge of a wing.

4. The flap system of claim 1, further comprising a linear drive means coupled with the flow body and the trailing flap.

5. The flap system of claim 1, further comprising a rotational drive means coupled with the flow body and the trailing flap.

6. The flap system of claim 1, wherein the chordwise movement is coupled with the rotary motion such that the trailing flap increases its angle measured between the chord axes along the complete extension motion.

7. The flap system of claim 1, wherein the movement means is adapted for conducting the chordwise movement and the rotary motion independently from each other.

8. A method for adjusting a lift of an aircraft, the method comprising:
moving a trailing flap out of a recess at a lower surface of a flow body in form of a flap by a movement means from a retracted position into a first extended position substantially without a gap between a leading edge of the trailing flap and the flow body and from a first extended position further into at least one second extended position by conducting a rotary motion,
wherein the movement means comprises at least one roller track guide, wherein the roller track guide comprises at least one track and at least one roller, wherein the roller is guided in the at least one track.

9. An aircraft comprising:
a wing; and
at least one flap system attached to a flow body of the aircraft, the at least one flap system comprising:
a flow body;
a trailing flap; and
a movement means;
wherein the flow body comprises an upper surface and a lower surface, the lower surface having a recess,
wherein the movement means is attachable to the flow body and the trailing flap;
wherein the trailing flap comprises a shape corresponding to the recess in the lower surface and having a retracted position and at least first and second extended positions;
wherein the movement means is adapted for conducting at least a chordwise movement of the trailing flap such that the trailing flap is movable out of the recess of the flow body from the retracted position into the first extended position substantially without a gap between the leading edge of the trailing flap and the flow body, and
wherein the trailing flap is movable from the first extended position further into the second extended position by conducting a rotary motion additional to the chordwise movement, and
wherein the movement means comprises at least one roller track guide, wherein the roller track guide comprises at least one track and at least one roller, wherein the roller is guided in the at least one track.

10. The aircraft of claim 9, wherein the flow body is a slotted flap on a trailing edge region of the wing.

11. The aircraft of claim 9, wherein the flow body is a trailing edge region of the wing.

12. A flap system for an aircraft, the flap system comprising:
a flap;
a trailing flap; and
a movement means;
wherein the flap comprises an upper surface and a lower surface, the lower surface having a recess,
wherein the movement means is attachable to the flap and the trailing flap;
wherein the trailing flap comprises a shape corresponding to the recess in the lower surface; and
wherein the movement means is adapted for conducting at least a chordwise movement of the trailing flap such that the trailing flap is movable out of the recess of the flap from a retracted position into a first extended position substantially without a gap between the leading edge of the trailing flap and the flap and such that the trailing flap is movable from the first extended position further into at least one second extended position by conducting a rotary motion additional to the chordwise movement, and
wherein the movement means comprises at least one roller track guide, wherein the roller track guide comprises at least one track and at least one roller, wherein the roller is guided in the at least one track.

* * * * *